US007539856B2

(12) United States Patent
Buch et al.

(10) Patent No.: US 7,539,856 B2
(45) Date of Patent: May 26, 2009

(54) DISTRIBUTED AUTHENTICATION IN A PROTOCOL-BASED SPHERE OF TRUST IN WHICH A GIVEN EXTERNAL CONNECTION OUTSIDE THE SPHERE OF TRUST MAY CARRY COMMUNICATIONS FROM MULTIPLE SOURCES

(75) Inventors: Jeremy Buch, Redmond, WA (US); Robert Brown, Kirkland, WA (US); Vishwajith Kumbalimutt, Redmond, WA (US); Sean Olson, Kirkland, WA (US); Srikanth Shoroff, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 653 days.

(21) Appl. No.: 10/445,768

(22) Filed: May 27, 2003

(65) Prior Publication Data
US 2004/0243838 A1 Dec. 2, 2004

(51) Int. Cl.
*H04L 9/00* (2006.01)
(52) U.S. Cl. .................................. 713/151
(58) Field of Classification Search .............. 713/151
See application file for complete search history.

(56) References Cited

U.S. PATENT DOCUMENTS 5,619,657 A 4/1997 Sudama et al.
6,412,070 B1 6/2002 Van Dyke et al. ........... 713/200
6,438,114 B1* 8/2002 Womack et al. ............ 370/329
2002/0091757 A1* 7/2002 Cuomo et al. .............. 709/203
2003/0066884 A1* 4/2003 Reddy et al. ............. 235/382.5
2004/0015596 A1* 1/2004 Sapuram et al. ............ 709/230

FOREIGN PATENT DOCUMENTS

WO  WO 03/092218 A1 *  3/2003

OTHER PUBLICATIONS

Jennings, C., et al., "Private Extensions to the Session Initiation Protocol (SIP) for Asserted Identity within Trusted Networks," RFC 3325, Nov. 2002 (19 pages).

\* cited by examiner

*Primary Examiner*—Kambiz Zand
*Assistant Examiner*—Jason K Gee
(74) *Attorney, Agent, or Firm*—Perkins Coie LLP (57) ABSTRACT

A distributed authentication model that operates within a protocol-based sphere of trust. Rather than being able to communicate with any one of the computing systems internal to the sphere of trust, the amount of authentication is reduced by having the external computing systems initially communicate with a specific edge internal computing system. Many if not all of the internal computing systems then delegate the task of authentication to the edge computing system, and will rely on any authentication performed by the edge computing system. This allows the task of authentication to scale well for large protocol-based spheres of trust.

23 Claims, 5 Drawing Sheets

DISTRIBUTED AUTHENTICATION IN A PROTOCOL-BASED SPHERE OF TRUST IN WHICH A GIVEN EXTERNAL CONNECTION OUTSIDE THE SPHERE OF TRUST MAY CARRY COMMUNICATIONS FROM MULTIPLE SOURCES

BACKGROUND OF THE INVENTION

1. The Field of the Invention

The present invention relates to network authentication technology. More specifically, the present invention relates to mechanisms in which authentication responsibility in a protocol-based sphere of trust is distributed and delegated throughout the sphere of trust.

2. Background and Related Art

Never before have so many had access to so much information, and never before have so many had the ability to readily communicate as they do now. This new era of highly advanced communication and information access is largely enabled by the advancement and proliferation of computer networks throughout the globe. Any individual having access to an Internet-enabled computing system may communicate with (or access resources from) any one of millions of other similarly-enabled computing systems (and potentially also their associated users). While this is certainly advantageous when behavior is appropriate, there is also the unfortunate opportunity to cause harm.

In order to mitigate harm caused in such a network environment, access to more highly sensitive network resources are controlled so that only certain computing systems or users may access that network resource. In order to identify a computing system to thereby make intelligent decisions on whether or not to grant access, it is necessary to determine the true identity of the computing system requesting access. Proper identification is accomplished in a common network process called "authentication".

One environment in which authentication is implemented is when a computing system that is external to a common sphere of trust is to communicate with a computing system that is internal to the common sphere of trust. One type of sphere of trust is a protocol-based sphere of trust in which the internal computing systems within the sphere of trust each other with regards to communications that follow a particular protocol, but not necessarily with regards to other types of communications.

If there are a large number of computing systems within the sphere of trust, and a large number of external computing systems that may desire to communicate with any one of the internal computing systems, each internal computing system would need to be ready to authenticate a large number of external computing systems. In order to prevent repeated requests for credentials, the server maintains state. As the total number of users who send requests to the server increases, it can lead to a big increase in the amount of state maintained on the server. Even if certificate-based authentication were not employed, the sheer number of external computing systems that each internal computing system may need to authenticate may overwhelm the memory and processing resources of the internal computing system.

Accordingly, what would be advantageous is an authentication mechanism applicable to an protocol-based sphere of trust in which reliable authentication may occur while preserving the memory and processing resources of the internal and external computing systems

BRIEF SUMMARY OF THE INVENTION

The foregoing problems with the prior state of the art are overcome by the principles of the present invention which are directed towards a distributed authentication model that operates within a protocol-based sphere of trust. The protocol-based sphere of trust includes a number of internal computing systems which trust communications between each other so long as the communications are in accordance with a particular protocol, but do not always trust communications between each other if the communication is not in accordance with the particular protocol. There are also a number of external computing systems outside the protocol-based sphere of trust that may desire to communicate with and/or through the internal computing systems.

Rather than being able to communicate with any one of the internal computing systems, the amount of authentication is reduced by having the external computing systems initially communicate with a specific internal computing system which we will hereinafter refer to as an "edge" computing system. Furthermore, as described herein, the external computing system only authenticates once when communicating with any internal computing system, and need not separately authenticate to each internal computing system in the path. Accordingly, the external computing system may also preserve storage and processing resources since state and processing associated with only one authentication is needed.

The edge computing system establishes a connection with a first external computing system. Through that connection, the edge computing system receives communications from a number of sources routed through the first external computing system. The edge computing system performs the work intensive task of authentication by acquiring appropriate credentials from the source of each communication. Authentication is a two-tier process when it comes to authentication in a path of computing systems. Upon receiving a communication, the edge computing system first authenticates the first external computing system (i.e., the immediately prior computing system in the path). If that is not the source of the communication (i.e., the path extends further beyond the immediately prior computing system in the path), then the given computing system also authenticates the source of the communication. Once its source is properly authenticated, the edge computing systems transmits the communication to another internal computing system that is either the destination of the communication, or through which the communication is further routed on its way to a destination internal or external to the sphere of trust.

The next internal computing system receives the communication from the edge computing system using the particular protocol. The next internal computing system also has a two-tier authentication process. As in the above-described two-tier authentication process, the first tier involves authenticating the immediately prior computing system in the communication path. However, the second tier involves something quite unique in the context of protocol-based spheres of trust. Specifically, the next internal computing system does not immediately authenticate the source of the communication through storage and processor intensive credential exchange. Instead, the next internal computing system accesses a list of internal computing systems that the next internal computing system trusts to authenticate external computing systems without the next internal computing system separately authenticating the external computing systems. If the edge computing system is on the list, then the next internal computing system validates the identity of the source of the communication without separately authenticating the source through credential exchange.

If the next internal computing system is the destination of the communication, then the next internal computing system may take appropriate action relying on the authentication performed by the edge computing system. For example, the next internal computing system may grant access to a requested resource that the source is permitted to access, or else return an access denied message if the source is not so permitted. If the next internal computing system is not the destination of the communication, then the next internal computing system may forward the communication along, and may even delegate the list checking to a subsequent internal computing system.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to a distributed authentication model that operates within a protocol-based sphere of trust. Rather than being able to communicate with any one of the computing systems internal to the sphere of trust, the amount of authentication is reduced by having the external computing systems initially communicate with a specific internal computing system which we will hereinafter refer to as an "edge" computing system. Many, if not all, of the internal computing systems then delegate the task of authentication to the edge computing system, and will rely on any authentication performed by the edge computing system. This allows the task of authentication to scale well for large protocol-based spheres of trust.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, any instructions and data which cause a general purpose computer, special purpose computer, or special purpose processing device to perform a certain function or group of functions. The computer-executable instruction may be, for example, binaries, intermediate format instructions such as assembly language, or even source code. Although not required, the invention will be described in the general context of computer-executable instructions, such as program modules, being executed by computers in network environments. Generally, program modules include routines, programs, objects, components, data structures, etc. that perform particular tasks or implement particular abstract data types.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Figure 1:
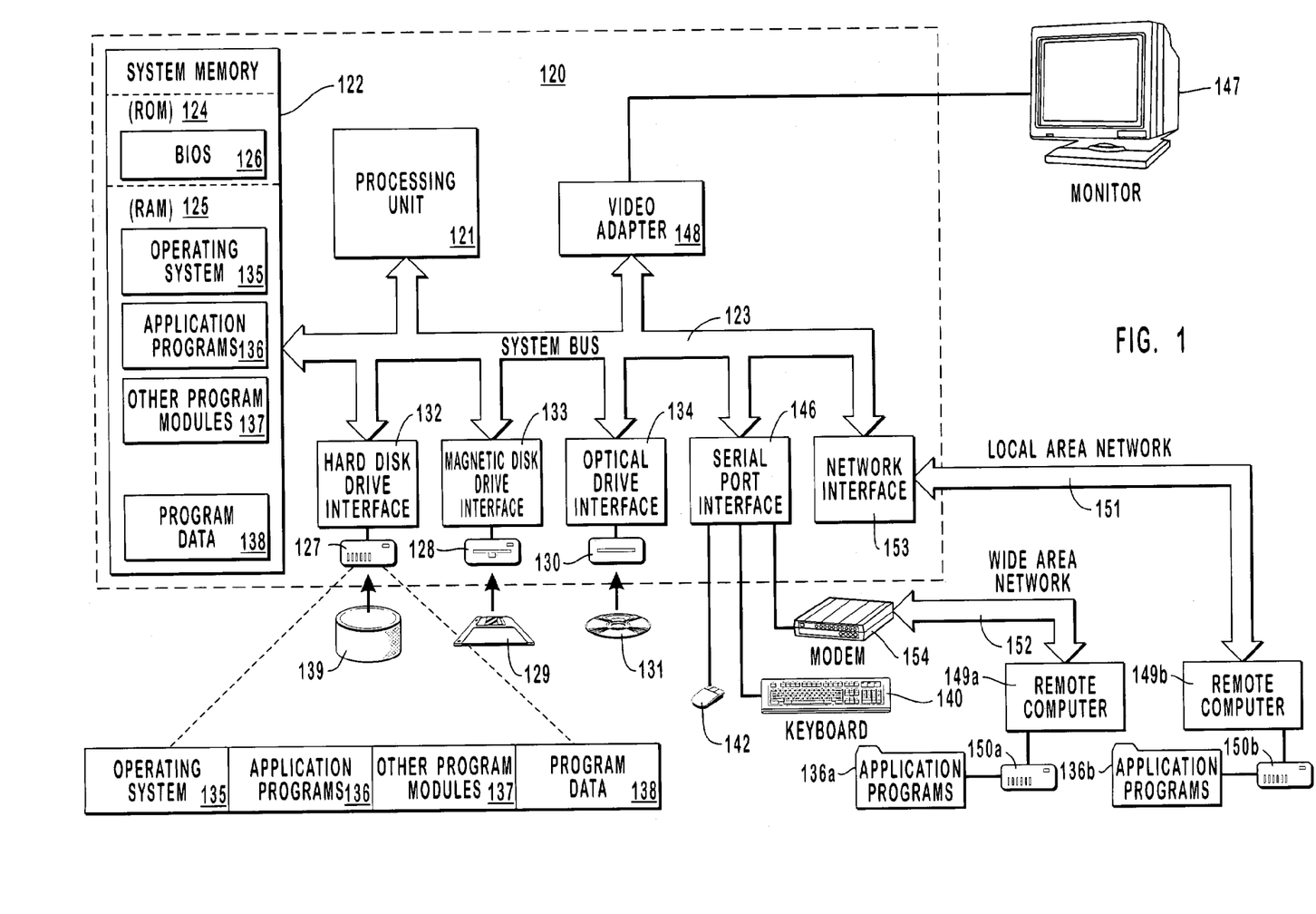
FIG. 1 illustrates a suitable computing system that may implement features of the present invention.

FIG. 1 illustrates suitable computing environment in which the principles of the present invention may be employed in the form of a computer 120. The computer 120 includes a processing unit 121, a system memory 122, and a system bus 123 that couples various system components including the system memory 122 to the processing unit 121.

The system bus 123 may be any of several types of bus structures including a memory bus or memory controller, a peripheral bus, and a local bus using any of a variety of bus architectures. The system memory includes read only memory (ROM) 124 and random access memory (RAM)

125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

While FIG. 1 illustrates an example of a computing system that may implement the principles of the present invention, any computing system may implement the features of the present invention. In the description and in the claims, a "computing system" is defined broadly as any hardware component or components that are capable of using software to perform one or more functions. Examples of computing systems include desktop computers, laptop computers, Personal Digital Assistants (PDAs), telephones, or any other system or device that has processing capability.

Figure 2:
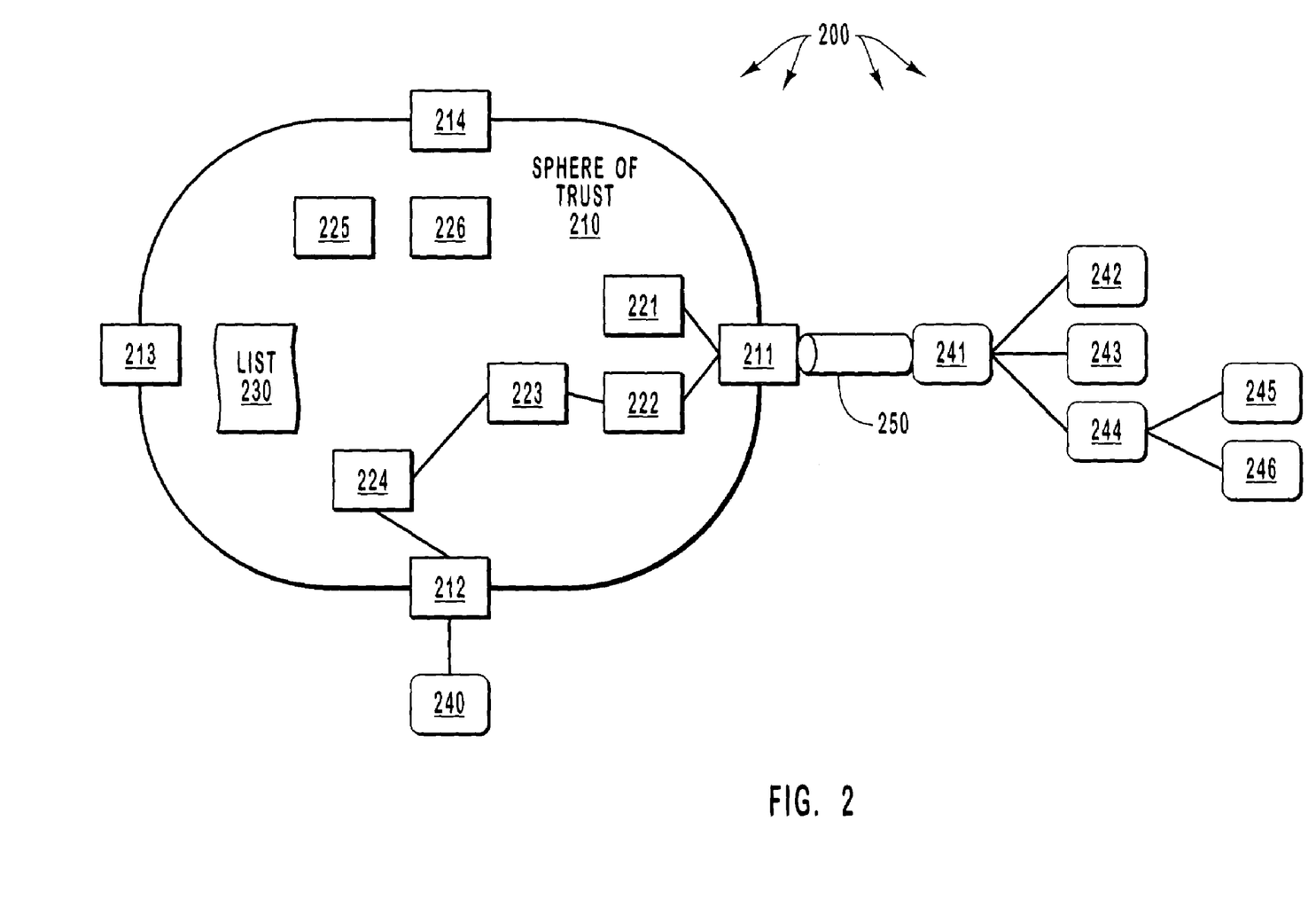
FIG. 2 illustrates a network environment in which the principles of the present invention may be employed including a protocol-based sphere of trust.

FIG. 2 illustrates a network environment 200 in which the principles of the present invention may be employed. The network environment 200 includes a protocol-based sphere of trust 210 that includes a number of computing systems which trust communications between each other so long as the communication is in accordance with the particular protocol upon which the sphere of trust is based. Hereinafter, computing systems that are within the protocol-based sphere of trust 210 will also be referred to as "internal" computing systems, while computing systems outside the protocol-based sphere of trust 210 will also be referred to as "external" computing systems. Because the sphere of trust 210 is based on the particular protocol, communications between the internal computing systems that are not in accordance with the particular protocol are not necessarily trusted.

The number and interconnection of the computing systems in a protocol-based sphere of trust 210 may be enumerable. For illustrative purposes only, the protocol-based sphere of trust 210 is illustrated as including computing systems 211 through 214 and 221 through 226. Internal computing systems 211 through 214 are illustrated at the edge of the protocol-based sphere of trust 210 because they have been enabled to interface with external computing systems and perform authentication through credential exchange. Accordingly, internal computing systems 211 through 214 will also frequently be referred to herein as "edge" computing systems or "edge" internal computing systems. The protocol-based sphere of trust 210 may be within a common enterprise or domain or may span multiple enterprises and/or portions of the Internet.

The network environment also includes external computing systems 240 through 246 which may desire to communicate with or through a given internal computing systems. Any of the computing systems 211 through 214, 221 through 226, and 240 through 246 may be structured as described above for the computer 120. However, such computing systems may take any other form that fall within the definition of computing system set forth herein.

Some of the external computing systems 241 through 246 are capable of communicating with an internal computing system through the edge computing system 211. For example, external computing system 241 is capable of communicating with an internal computing system through the edge computing system 211 using a connection 250 between the external computing system 241 and the edge computing system 211. External computing systems 242 through 246 are also capable of communicating through the external computing system 241, through the connection 250, through the edge computing system 211, and to the internal computing systems. One protocol that allows for the common sharing of a single connection for multiple sources and multiple destinations is Session Initiation Protocol (SIP). In one embodiment, the protocol-based sphere of trust 210 is based on SIP as the trusted protocol.

Figure 3:
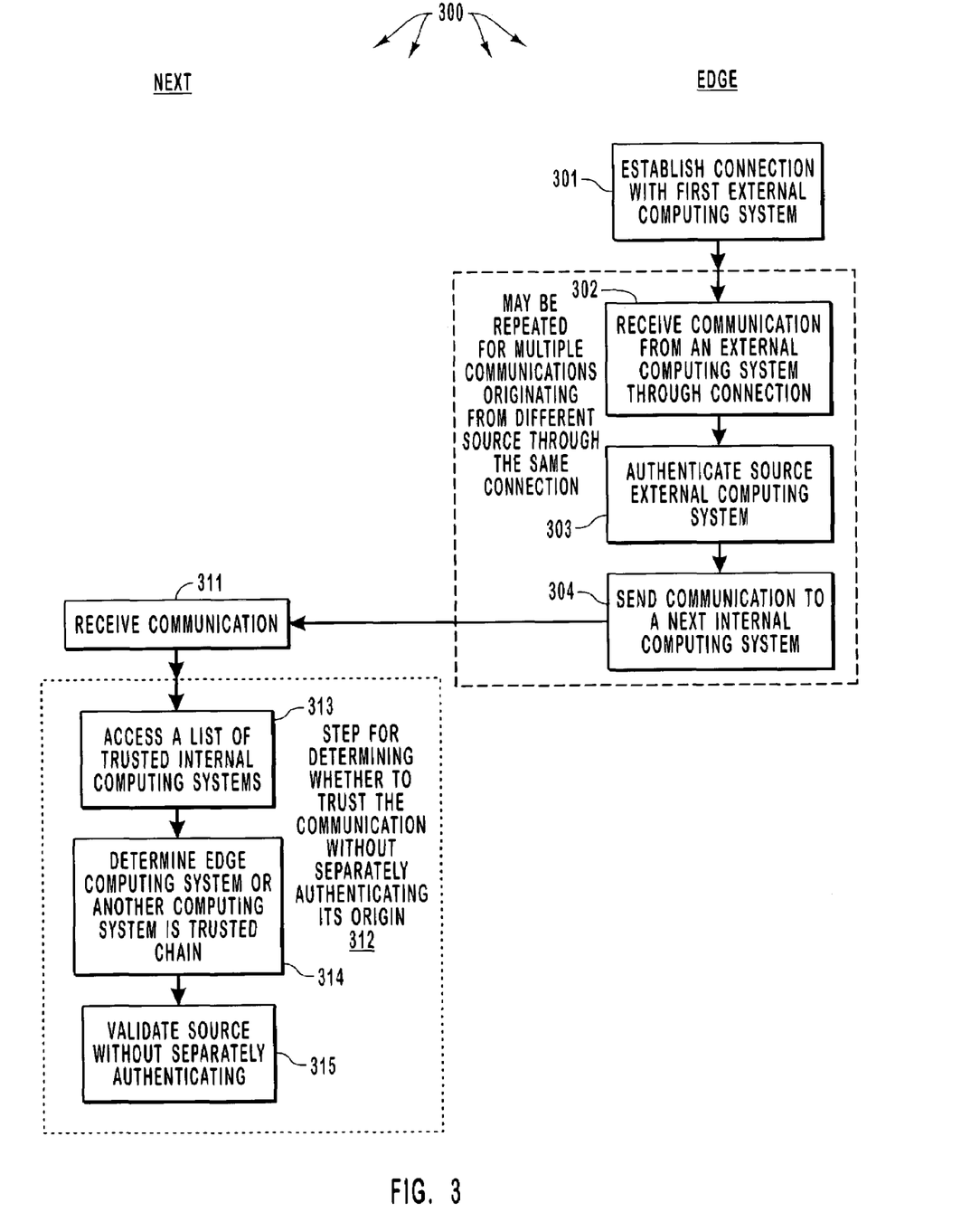
FIG. 3 illustrates a method for performing distributed authentication in a protocol-based sphere of trust in accordance with the principles of the present invention.

FIG. 3 illustrates a method 300 of distributing authentication through the protocol-based sphere of trust 210. The method 300 may be performed in the context of the network environment 200. Accordingly, the method 300 of FIG. 3 will be described with frequent reference to the network environment 200 of FIG. 2. Some of the acts of the method 300 are performed by an edge computing system as represented in the right column of FIG. 3 under the heading "EDGE". Other acts and a step are performed by another internal computing system as represented in the left column of FIG. 3 under the heading "NEXT".

The edge computing system first establishes a connection with an external computing system (act 301). For example, referring to FIG. 2, the edge computing system 211 establishes a connection 250 with the external computing system 241. At this stage, the edge computing system 211 may receive communications over the connection 250 from any one of external computing systems 241 through 246. The edge computing system 211 then receives a communication from the first computing system 241, the communication originating from any of external computing systems 241 through 246 (act 302).

The edge computing system 211 then authenticates the source external computing system (act 303) and then forwards the communication, or a derivative thereof, to the next internal computing system (act 204). This authentication may be performed using any authentication mechanism including NTLM, Kerberos, Basic, Digest, IPSec over MTLS or the like. The next internal computing system may be the destination of the computing system. For example, the internal computing system 221 represents a potential next computing system 221 for the communication.

On the other hand, the next computing system may not be the destination of the communication, but merely a computing system through which the communication is routed. For example, the internal computing system 222 may be used to route the communication to another internal computing system or to an external computing system. For example, the next computing system 222 may be used as an intermediary computing system when communicating with any of internal computing systems 223, 224 and 225, or to an external computing system 240. The communication is communicated from computing system to computing system using the particular protocol upon which the sphere of trust 210 is based.

The next internal computing system then receives the communication from the edge computing system using the particular protocol (act 311). The next internal computing system then performs a first-tier of a two-tier authentication processes by authenticating the edge computing system using, for example, Mutually authenticated Transport Layer Protocol (MTLS), but does not authenticate the external computing system that originated the communication. If MTLS is used to authenticate, the connection between the various internal computing systems may even be over a public or untrusted network such as the Internet.

The next internal computing system then performs a functional result-oriented step for determining whether to trust the communication without separately authenticating the originating external computing system (step 312). This functional, result-oriented step may include any corresponding acts that accomplish the result. In the illustrated embodiment, the step 312 includes corresponding acts 313, 314 and 315.

The next internal computing system performs a second tier of the authentication process by validating the identity of the originating external computing system. Specifically, the next internal computing system accesses a list of internal computing systems that the next internal computing system trusts to authenticate external computing systems without the internal computing system separately authenticating the external computing systems. This list is illustrated in FIG. 2 as list 230. The list 230 may be shared among all of the internal computing systems, where each of the internal computing systems are willing to trust the same internal computing systems to perform authentication of external computing systems. The list may be shared or have copies distributed throughout the protocol-based sphere of trust 210. The copies may be the same, or may be different. The difference may be the result of some replication delay or perhaps may be intentionally variations.

For example, in one embodiment, the edge computing systems 211 through 214 are trusted by the other internal computing systems 221 through 226 to perform authentication of external computing systems. In another embodiment, groups of one or some of the edge computing systems may be trusted to authenticate external computing systems for a portion of the internal computing systems while other edge computing systems perform authentication of external computing systems for yet other internal computing systems.

The next internal computing system then determines that the edge computing system is on the list (act 314) and in response validates the identity of the originating external computing system by mere virtue of the edge computing system being on the list, and without separately authenticating the originating external computing system (act 315). In this description and in the claims, "authentication" means a process whereby one computing system obtains assurances through the receipt of credentials that the party providing the credentials is indeed who or what they purport to be. In this description and in the claims, "validation" means a process whereby one computing system obtains assurances that a party is who they purport to be, whether by receiving credentials of that party or by some other means.

If the next computing system is not the destination of the communication, the communication may be forwarded to a subsequent internal computing system and so on and so forth until the communication arrives at a destination within the sphere of trust 210, or until the communication reaches another edge computing system for delivery external to the sphere of trust 210. Each of the subsequent internal computing systems may perform the same process as described above for the next internal computing system. For example, if the communication is to be delivered from the originating external computing system 242 to the destination external computing system 240, each of the internal computing system 222, 223, 224 and 212 may perform the acts and step attributed above to the next internal computing system.

For instance, each of internal computing systems 222, 223, 224 and 212 may receive the communication, authenticate the previous internal computing system in the path (but not authenticate the originating external computing system), and use the list to determine that a previous internal computing system in the delivery chain is authorized to authenticate or validate the originating external computing system, and then themselves validate the originating external computing system without separately performing authentication of the originating external computing system through credential exchange.

Accordingly, the principles of the present invention allow for substantial simplification of authentication by allowing for relatively few edge computing system to perform the often memory and processor intensive task of authentication, while the other internal computing systems trust their authentication. This relieves those other internal computing systems from the authentication processes. Therefore, the principles of the present invention scale well for larger protocol-based spheres of trust.

The principles of the present invention work particularly well when a smaller number of connections are used to allow multiple external computing systems to communicate to or through an internal computing system via an edge computing system. In other words, any given connection (even if there are multiple connections) may be used to allow multiple external computing systems to communicate to or through an internal computing system via an edge computing system. The edge computing systems do not need to perform the complex tasks associated with establishing a single connection for each and every external computing system that it is to authenticate on behalf of other internal computing systems. Accordingly, fewer edge internal computing systems are needed in order to authenticate a given number of external computing systems. This further allows the present invention to scale well for larger networked protocol-based spheres of trust.

Figure 4:
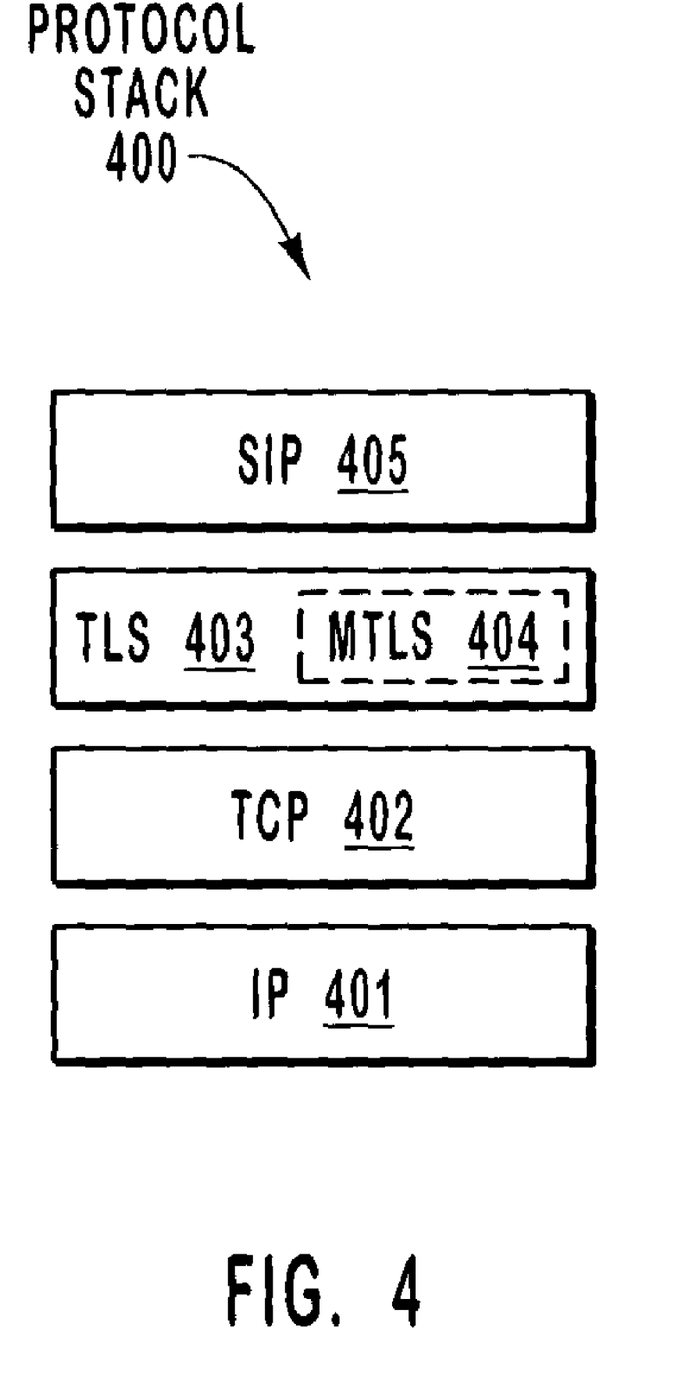
FIG. 4 illustrates a protocol stack in which Session Initiation Protocol may be implemented using Transport Layer Security (TLS) or Mutually authenticated TLS (MTLS) and further using Transmission Control Protocol (TCP) and Internet Protocol (IP)

In one specific implementation, the communications between computing systems use SIP. FIG. 4 illustrates a protocol stack 400 in which a SIP layer 405 may operate. If the computing system maintaining the protocol stack 400 was computer 120, then each of the layers of the protocol stack 400 may be represented by other program modules 137 in FIG. 1. This SIP layer 405 operates on top of a Transmission Control Protocol layer 402, which operates on top of an Internet Protocol layer 401. Optionally, a TLS layer 403 resides between the SIP layer 405 and the TCP layer 402. The TLS layer 403 optionally incorporates MTLS functionality to allow for mutual authentication.

Figure 5:
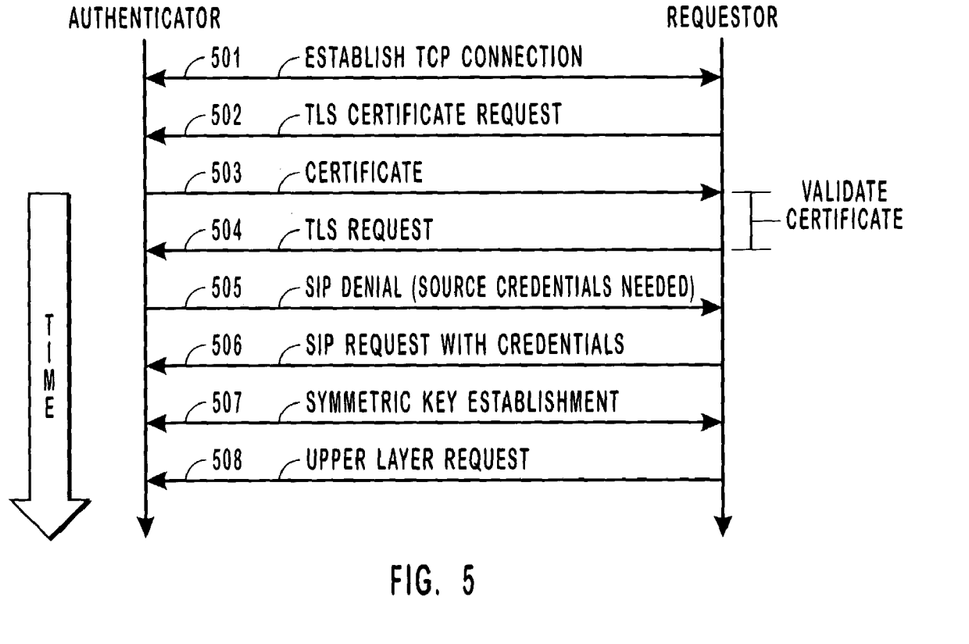
FIG. 5 illustrates a data flow associated with authentication using SIP and TLS.

FIG. 5 illustrates a method for an external computing system communicating with each other and with an edge internal computing system in accordance with one embodiment of the invention. The communication occurs between an authenticator and a requester. For example, when any of the external computing systems 241 through 246 is to communicate with the edge computing system 211, the requester may be represented by the external computing system 241, while the authenticator may be represented by the edge computer system 211.

Referring to FIG. 5, the requester and the authenticator establish a TCP connection using the TCP layer 402 as represented by bidirectional arrow 501. The connection 150 may be, for example, a TCP connection. Processing is then passed up to the TLS layer 403. The requester then issues a TLS certificate request to the authenticator as represented by arrow 502. The authenticator then returns the certificate as represented by arrow 503. The requestor validates the certificate and then issues a TLS request as represented by arrow 504 to the authenticator. The authenticator then passes processing up to the SIP layer 405, which issues a SIP access denied message back to the requestor as represented by arrow 505. The requestor then provides appropriate credentials in the form of a certificate for the source that originated the communication back to the authenticator as represented by arrow 506. The authenticator then may authenticate the requester using credentials. Both parties may then derive a symmetric key as represented by bidirectional arrow 507. An upper layer request may then be provided to the authenticator as represented by arrow 508.

Figure 6:
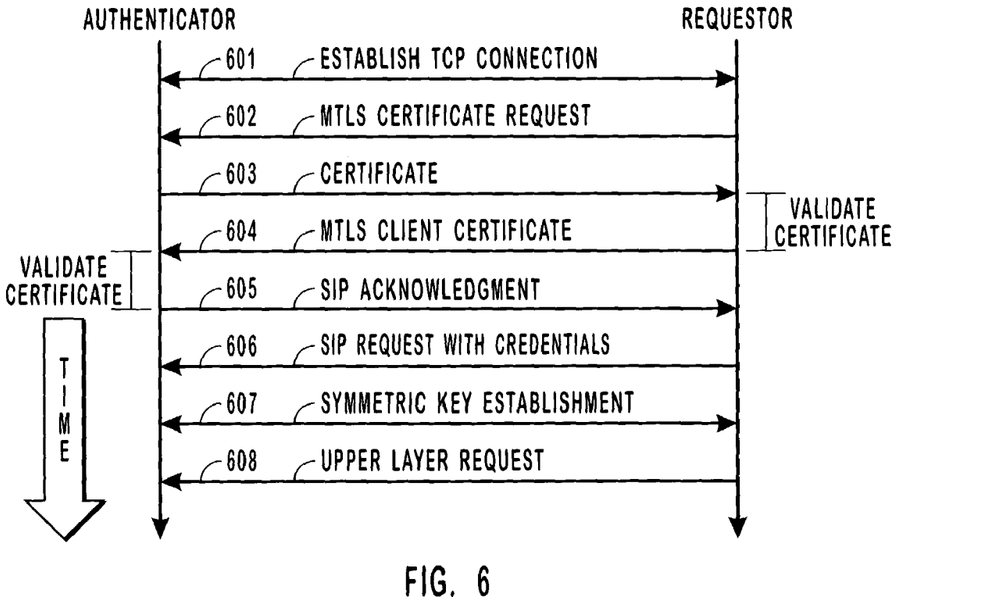
FIG. 6 illustrates a data flow associated with authentication using SIP and MTLS.

In one embodiment, the internal computing systems communicate using SIP over MTLS. This communication process is represented by the data flow of FIG. 6, which is the same as the data flow of FIG. 5, with some exceptions. Specifically, MTLS is used instead of TLS, the MTLS request 604 is provided with the certificate of the requester, and the credential, which the authenticator validates.

If the sphere of trust is within a common enterprise, the list may be established by using an identification of each computing systems in the enterprise as provided by the system administrator. New internal computing systems may also be added, and other deleted, by the system administrator. When outside of a strict enterprise environment, computing systems may be added by common consensus of the other internal computing systems.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method of authenticating a source computing system from which a communication originates in a network, the method comprising:

receiving at a destination computing system the communication that originates from the source computing system and travels through one or more intermediary computing systems using a particular protocol, wherein the destination computing system and at least one of the one or more intermediary computing systems belong to a protocol-based sphere of trust, wherein at least one of the intermediary computing systems belonging to the protocol-based sphere of trust receives the communication from an intermediary computing system outside the sphere of trust that it does not trust, wherein the protocol-based sphere of trust includes a plurality of computing systems that trust communications between each other that use the particular protocol, and wherein the source computing system does not belong to the sphere of trust;

accessing a list of computing systems that belong to the sphere of trust that the destination computing system trusts to authenticate computing systems that do not belong to the sphere of trust;

determining that at least one of the one or more intermediary computing systems through which the communication was received is on the list and that the at least one intermediary computing system on the list has validated the identity of the source computing system; and validating the identity of the source computing system that does not belong to the sphere of trust by relying on the at least one intermediary computing system on the list and without separately authenticating the source computing system even though the communication traveled through an intermediary computing system that was not trusted wherein a first intermediary computing system belonging to the protocol-based sphere of trust performs a two-tiered authentication process by performing a first-tier authentication of an immediately prior computing system; and when the immediately prior computing system is the source computing system, validating the source computing system based on the first-tier authentication of the immediately prior computing system without performing a second-tier authentication; and when the immediately prior computing system is not the source computing system, performing the second-tier authentication on the source computing system so that the second-tier authentication can be avoided when the source computing system is immediately prior to the first intermediary computing system.

2. The method of claim 1 wherein the destination computing system receives the communication from a single intermediary computing system that belongs to the sphere of trust, and wherein determining comprises determining that the single intermediary computing system that belongs to the sphere of trust is on the list.

3. The method of claim 1 wherein determining that at least one of the one or more intermediary computing systems through which the communication was received is on the list comprises determining that the intermediary computing system immediately prior to the destination computing system is on the list.

4. The method of claim 1 wherein determining that at least one of the one or more intermediary computing systems through which the communication was received is on the list comprises determining that any of the intermediary computing systems is on the list.

5. The method of claim 1 wherein the particular protocol is Session Initiation Protocol (SIP).

6. The method of claim 1 wherein all of the intermediary computing systems in the protocol-based sphere of trust are within a common enterprise.

7. The method of claim 1 further comprising adding a computing system to the list.

8. The method of claim 7 wherein adding a computing system to the list is performed in response to receiving an instruction from a system administrator.

9. The method of claim 1 wherein the one or more intermediary computing systems are not in a common enterprise.

10. A system with a processor and memory for authenticating communications in a network, the system comprising:
    a communication receiving component configured to receive at a destination computing system a communication that originates from a source computing system through one or more intermediary computing systems using a particular protocol, wherein the destination computing system and at least one of the one or more intermediary computing systems belong to a protocol-based sphere of trust, wherein the protocol-based sphere of trust includes a plurality of computing systems that trust communications between each other that use the particular protocol, and wherein the source computing system does not belong to the sphere of trust; and
    a source validating component configured to validate the identity of the source computing system that does not belong to the sphere of trust without separately authenticating the source computing system and by relying on at least one intermediary computing system within the sphere of trust that received the communication and previously authenticated the identity of the source computing system wherein the at least one intermediary computing system that previously authenticated the identity of the source computing system performs a two-tiered authentication process by
        performing a first-tier authentication of an immediately prior computing system; and
        when the immediately prior computing system is the source computing system, validating the source computing system based on the first-tier authentication of the immediately prior computing system without performing a second-tier authentication; and
        when the immediately prior computing system is not the source computing system, performing the second-tier authentication on the source computing system.

11. The system of claim 10 wherein the destination computing system receives the communication from a single intermediary computing system that belongs to the sphere of trust, and wherein the source validating component determines that the single intermediary computing system belongs to the sphere of trust.

12. The system of claim 10 wherein the source validating component determines that at least one of the one or more intermediary computing systems through which the communication was received belongs to the sphere of trust by determining that the intermediary computing system immediately prior to the destination computing system belongs to the sphere of trust.

13. The system of claim 10 wherein the source validating component determines that at least one of the one or more intermediary computing systems through which the communication was received previously authenticated the identity of the source computing system by determining that any of the intermediary computing systems belongs to the sphere of trust.

14. The system of claim 10 wherein the particular protocol is Session Initiation Protocol (SIP).

15. The system of claim 10 wherein all of the intermediary computing systems in the protocol-based sphere of trust are within a common enterprise.

16. The system of claim 10 including a sphere of trust management component configured to add a computing system to the sphere of trust.

17. The system of claim 16 wherein the sphere of trust management component adds a computing system to the sphere of trust in response to receiving an instruction from a system administrator.

18. The system of claim 10 wherein the one or more intermediary computing systems are not in a common enterprise.

19. A method in a network of authenticating a source computing system from which a communication originates, the communications being sent to a destination computing system within the network, the network having internal computing systems, the method comprising:
    providing a list of internal computing systems that belong to a protocol-based sphere of trust that trust each other to authenticate computing systems that do not belong to the protocol-based sphere of trust, the destination computing system belonging to the protocol-based sphere of trust and the source computing system not belonging to the protocol-based sphere of trust such that the internal computing systems within the protocol-based sphere of trust do not trust the source computing system; and
    under control of an internal computing system within the protocol-based sphere of trust, receiving a communication from an immediately prior computing system and performing a two-tiered authentication process by:
        performing a first-tier authentication of the immediately prior computing system from which the communication is received;
        when the immediately prior computing system has been authenticated,
            when the immediately prior computing system is the source computing system, validating the source computing system based on the first-tier authentication of the immediately prior computing system without performing a second-tier authentication; and when the immediately prior computing system is not the source computing system,
- accessing the provided list of internal computing systems to determine whether a prior computing system in the protocol-based sphere of trust has already processed the communication;
- when it is determined that a prior computing system in the protocol-based sphere of trust has already processed the communication, validating the source computing system, without separately performing the second-tier authentication of the source computing system by relying on that prior computing system having either authenticated or validated the source computing system; and
- when it is determined that a prior computing system in the protocol-based sphere of trust has not already processed the communication, performing a second-tier authentication on the source computing system; and after the source computing system has been validated or authenticated and when the internal computing system is not the destination computing system, forwarding the communication onto the destination computing system.

20. The method of claim 19 wherein the destination computing system receives the communication from a single intermediary computing system that belongs to the sphere of trust, and wherein the destination computing system determines that the single intermediary computing system that belongs to the sphere of trust is on the list.

21. The method of claim 19 wherein the particular protocol is Session Initiation Protocol (SIP).

22. The method of claim 19 wherein all computing systems in the protocol-based sphere of trust are within a common enterprise.

23. The method of claim 19 further comprising adding a computing system to the list.

\* \* \* \* \*